Aug. 28, 1962 L. M. SMITH 3,051,929

DIGITAL DATA CONVERTER

Filed March 13, 1959 3 Sheets-Sheet 1

INVENTOR
L. M. SMITH
BY R. O. Nimtz
ATTORNEY

INVENTOR
L. M. SMITH
BY R. O. Nimz
ATTORNEY

DIGITAL DATA CONVERTER

INVENTOR
L. M. SMITH
BY R. O. Nimz
ATTORNEY

United States Patent Office 3,051,929

Patented Aug. 28, 1962

3,051,929
DIGITAL DATA CONVERTER

Larrabee M. Smith, Morris Plains, N.J., assignor to Bell Telephone Laboratories, Incorporated, New York, N.Y., a corporation of New York Filed Mar. 13, 1959, Ser. No. 799,183
4 Claims. (Cl. 340—172.5)

This invention relates to digital data processing and, more particularly, to the conversion of serial digital data from a first to a second pulse rate.

It is frequently desirable to interconnect two data processing systems which are responsive to serial pulse data of different repetition rates. This interconnection necessitates a conversion of a pulse train appearing at a first rate to an equivalent pulse train at a second rate. Since it is desirable that no accumulation of data take place in such a converter, the message must have an equal duration at the two rates. To this end, the pulse train at the higher rate is divided into binary "messages," i.e., pulse groups, or "blocks" separated by a guard space in which no data appears. The duration of such a guard space must be at least sufficient to take up the difference between the message intervals at the two repetition rates. Any further increases in the duration of the guard space, however, represent a reduction in the information rate of the system and are to be avoided.

It is also desirable, in many rate conversion systems, to translate the digits or bits of each binary message into another code representation before passing it on to processing equipment at a different rate. It may happen, for example, that the second processing equipment not only operates at a different pulse rate, but also operates most advantageously with the order of the digits reversed or otherwise permutated. Thus, it may be necessary to translate each binary message into a new code pattern as well as convert its basis pulse rate.

It is well known to use various forms of shift registers to accomplish the above described conversion and translation. One approach, for example, is to serially pulse the information into a first shift register at the input pulse rate, transfer the contents of the first shift register into a second shift register through a parallel translator, and pulse the new message out of the second register at the output pulse rate. During this outpulsing, the first register may be receiving the following "message" at the input rate. Such a system, however, requires 2N stages of storage, where N is the number of bits in a message. The system is very inefficient in this respect in view of the fact that only N information bits are involved.

To reduce the number of stages of storage, it has been proposed to use a single shift register, to shift each message into the register at the input rate, to translate by means of parallel translation loops returning to the same register stages, and to shift the new message out at the output rate. It can easily be seen, however, that the price paid for this reduction in apparatus is a reduction in the information rate of the converter since the guard space must be equal to the entire message length at the output pulse rate.

It is an object of the present invention to improve the information rate of serial data rate converter-translators without increasing the storage capacity required for such converter-translators.

It is a more specific object of the invention to translate and convert serial pulse data from one pulse rate to another and from one code to another at a maximum rate and with a minimum of equipment.

In accordance with the present invention, a single shift register having a number of stages equal to the number of bits in each message of an incoming pulse train is split into a plurality of sections each capable of operating independently at either one of two shifting rates. These two rates, corresponding to the input pulse rate and the output pulse rate, are used alternately by the sections of the shift register so as to receive information at the input rate and transmit information at the output rate.

To this end, the number of stages of storage in successive sections are related by the ratio between the input and output pulse rates. In this way, a section may be emptied at the outpulsing rate before the preceding section is filled at the inpulsing rate. The entire register may then be filled at the inpulsing rate and emptied at the outpulsing rate without delaying inpulsing until the entire register is emptied. Translation can be accomplished by means of parallel translating loops enabled when the register is full. Since this is a parallel operation, very little time is consumed for this translation.

It can be seen that the total number of stages of storage required for the arrangements of the present invention is kept to a minimum, roughly corresponding to the number of bits in a message. At the same time, the duration of the guard space in the data at the higher pulse rate is also kept to a minimum since inpulsing can begin before outpulsing is completed. The information rate of the converter is, therefore, close to the maximum.

These and other objects and features, the nature of the present invention and its various advantages, can be more readily understood upon consideration of the attached drawings and of the following detailed description of these drawings.

Figure 1:
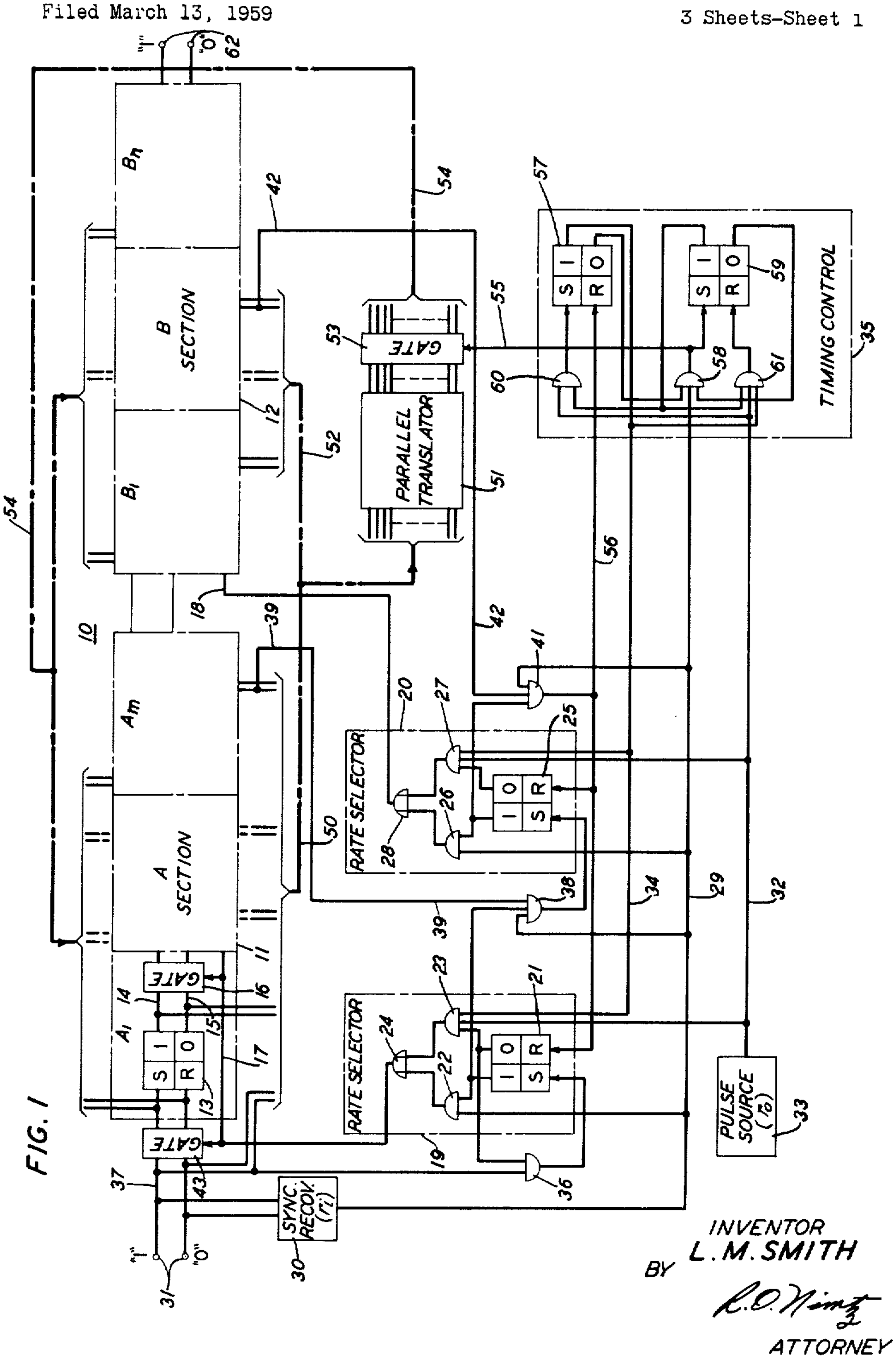
FIG. 1 is a schematic block diagram of a serial pulse rate converter having a shift register split into two sections in accordance with the present invention.

Referring more particularly to FIG. 1 there is shown a pulse rate converter in accordance with the invention comprising a shift register 10 divided into two sections, the A-section 11 and the B-section 12. Each section comprises a plurality of shift register stages similar to the $A_1$ stage of section A. The $A_1$ stage comprises a bistable device 13 capable of being in either one of two states, represented by the "1" and the "0" on the figure. An input to "S" sets device 13 to the "1" state while an input to "R" resets device 13 to the "0" state. While in the "1" state, device 13 produces a signal condition of a first kind, for example, a positive voltage, on lead 14 and a signal condition of a second kind, for example, zero voltage, on lead 15. While in the "0" state, device 13 produces the signal condition of the first kind on lead 15 and of the second kind on lead 14. Device 13, may, for example, be any one of the many forms of bistable multivibrator known in the art.

The outputs of bistable device 13 are delivered to an advance gate 16 which is operated by a pulse on advance bus 17 to shift the output condition of device 13 to the bistable device in the succeeding stage of section 11 of shift register 10. The advance gate of each stage of section 11 is connected to advance bus 17 while the advance gate of each stage of section 12 is connected to advance bus 18. Advance pulses on bus 17 or bus 18 serve to advance the state of each stage in sections 11 and 12, respectively, to the succeeding stage. This operation is in accordance with well-known principles and is embodied in shift registers of many types known to the art.

In accordance with the present invention, section 11 and section 12 of shift register 10 are each capable of being shifted at different operating rates independently of the other section. To this end, the shift pulses for section 11 are derived from rate selecting network 19 and the shift pulses for section 12 are derived from rate selecting network 20. Network 19 comprises a bistable device 21, two AND gates 22 and 23 and an OR gate 24. Similarly, network 20 comprises a bistable device 25, two AND gates 26 and 27 and an OR gate 28. Bistable devices 21 and 25 are similar to device 13 and may, for example, comprise bistable multivibrators. AND gates 22 and 26 are two-input gates of the general type which produces an output when and only when both inputs are simultaneously energized. Gates 22 and 26 may comprise any diode, transistor, vacuum tube or other logical AND circuit known in the art.

Gates 23 and 27 are three-input AND gates of the general type which produces an output when and only when all three inputs are simultaneously energized. Gates 23 and 27 may also comprise any known logical AND circuit. Gates 24 and 28 are also two-input gates but of the general type which produces an output when either one or both inputs are energized. Gates 24 and 28 may comprise any diode, transistor, vacuum tube or other logical OR circuit known in the art.

Networks 19 and 20 are arranged such that the "1" output of bistable device 21 is applied to AND gate 22 and the "0" output to AND gate 23, and the "1" output of device 25 is applied to AND gate 26 and the "0" output to AND gate 27. Also applied to AND gates 22 and 26 are the timing pulses on bus 29. These timing pulses occur at a rate $r_i$ and are derived from a synchronization recovery circuit 30. Circuit 30 utilizes the message pulse input train applied to terminals 31 to derive clock pulses having the same repetition rate as the message pulses. These clock pulses on bus 29 therefore occur at the input pulse rate. Synchronization recovery circuits suitable for this purpose are well known and will not be described here since they form no part of the present invention. Such a circuit is disclosed for example, in the copending application of A. D. Perry, Jr., Serial No. 692,174, now U.S. Patent No. 2,957,045 filed October 24, 1957.

Timing pulses occurring at a different rate $r_o$, are applied to gates 23 and 27 from a second bus 32. The timing pulses on bus 32 are derived from a clock pulse source 33. Source 33 produces clock pulses having a repetition rate equal to the desired repetition rate of the output of the pulse rate converter. Pulses on bus 32 therefore occur at the output pulse rate.

Also applied to AND gates 23 and 27 is the voltage condition on an enabling bus 34. This voltage condition is derived from a timing control circuit 35, to be described in detail hereafter.

The outputs of AND gates 22 and 23 provide the inputs to OR gate 24 while the outputs of AND gates 26 and 27 provide the inputs to OR gate 28. From the arrangement described, it can be seen that the advance pulses applied to advance bus 17 in section 11 of shift register 10 are derived from bus 29 or bus 32. If device 21 is in the "1" state, gate 22 is partially enabled by the "1" output and its enablement is completed during each pulse on bus 29. Simultaneously, AND gate 23 is disabled by the absence of a "0" output from device 21. Conversely, if device 21 is in the "0" state, gate 23 is partially enabled by the "0" output. If enabling bus 34 is simultaneously energized, AND gate 23 is completely enabled during each pulse on bus 32. Simultaneously, AND gate 22 is disabled by the absence of a "1" output from device 21.

It can be seen that A-section 11 may be advanced at the input pulse rate ($r_i$) or the output pulse rate ($r_o$), depending on the condition of bistable device 21. Likewise, in accordance with a very similar operation, B-section 12 may be advanced at the input pulse rate or the output pulse rate, depending on the condition of bistable device 25. Networks 19 and 20 therefore select the pulse rate at which information in sections 11 and 12, respectively, will be advanced.

Bistable device 21 in network 19 is set to the "1" state by the application of a signal to the set input "S." This signal is derived from a two-input AND gate 36. One input to AND gate 36 is derived from the "0" output of device 21 while the other input is derived from line 37, representing a "1" state or MARK in the input pulse train. Bistable device 21 will therefore be set any time it is already in the zero state and a MARK appears at input terminals 31.

Bistable device 25 in network 20 is set to the "1" state by the application of a signal to the set input "S" of that device. This signal is derived from a three-input AND gate 38. One input to AND gate 38 is derived from the '1" output of device 21 in network 19. Another input to gate 38 is derived from lead 39. Lead 39 is connected to the "1" output of the bistable device in the last, or $A_m$, stage of A-section of shift register 10. The third input to gate 38 is derived from bus 29, carrying the input clock pulses. Bistable device 25 will therefore be set to the "1" state on the next input clock pulse following the arrival of a "1" or MARK in the last stage of section 11, provided that device 21 is, at the time, in the "1" state.

Both of bistable devices 21 and 25 are reset to the "0" condition by the application of the pulse to reset bus 56. The reset signals on bus 56 are derived from a three-input AND gate 41. One input to AND gate 41 is derived from the "1" output of device 25 in network 20. Another input to gate 41 is derived from lead 42. Lead 42 is connected to the "1" output of the bistable device in the second-last, or $B_{n-1}$, stage of B-section 12 of shift register 10. The third input to gate 41 is derived from bus 29, carrying the input clock pulses. Bistable devices 21 and 25 will therefore be reset to the "0" state on the next input clock pulse following the arrival of a "1" or MARK in the second-last stage of section 12, provided that device 25 is, at the time, in the "1" state.

Having described in part the components of the pulse rate converter 8 in FIG. 1, the operation of these components will now be described. It will be remembered that the purpose of the circuit of FIG. 1 is to take a message pulse train arriving at terminals 31, having a basic repetition rate of $r_i$ and incorporating a given code representation, to translate this input pulse train to an output pulse train incorporating a different code representation, and to transmit the translated pulse train at a repetition rate $r_o$ different from the input repetition rate $r_i$. In accordance with the present invention, this rate conversion and translation is accomplished with a minimum of equipment and time loss.

In order to translate the information carried by the input pulse train from one code representation to another code representation, it is necessary to divide the message into blocks of uniform length. Without such a division, it would be difficult, if not impossible, for the translating mechanism to know when or how much of the message is to be translated. Furthermore, such translations normally require knowledge of the last bit in the block before a correct translation can be made.

Since the input and output pulsing rates are different, such a system requires a guard space between the blocks of information having the higher repetition rate. Without this guard space, information would have to be continually accumulated in the rate converter where the input rate was higher than the output rate. Such a situation is clearly not desirable. In accordance with the present invention, the lost time, represented by the excess of guard space over that required to equalize the information rates, is kept to a minimum.

Figure 3:
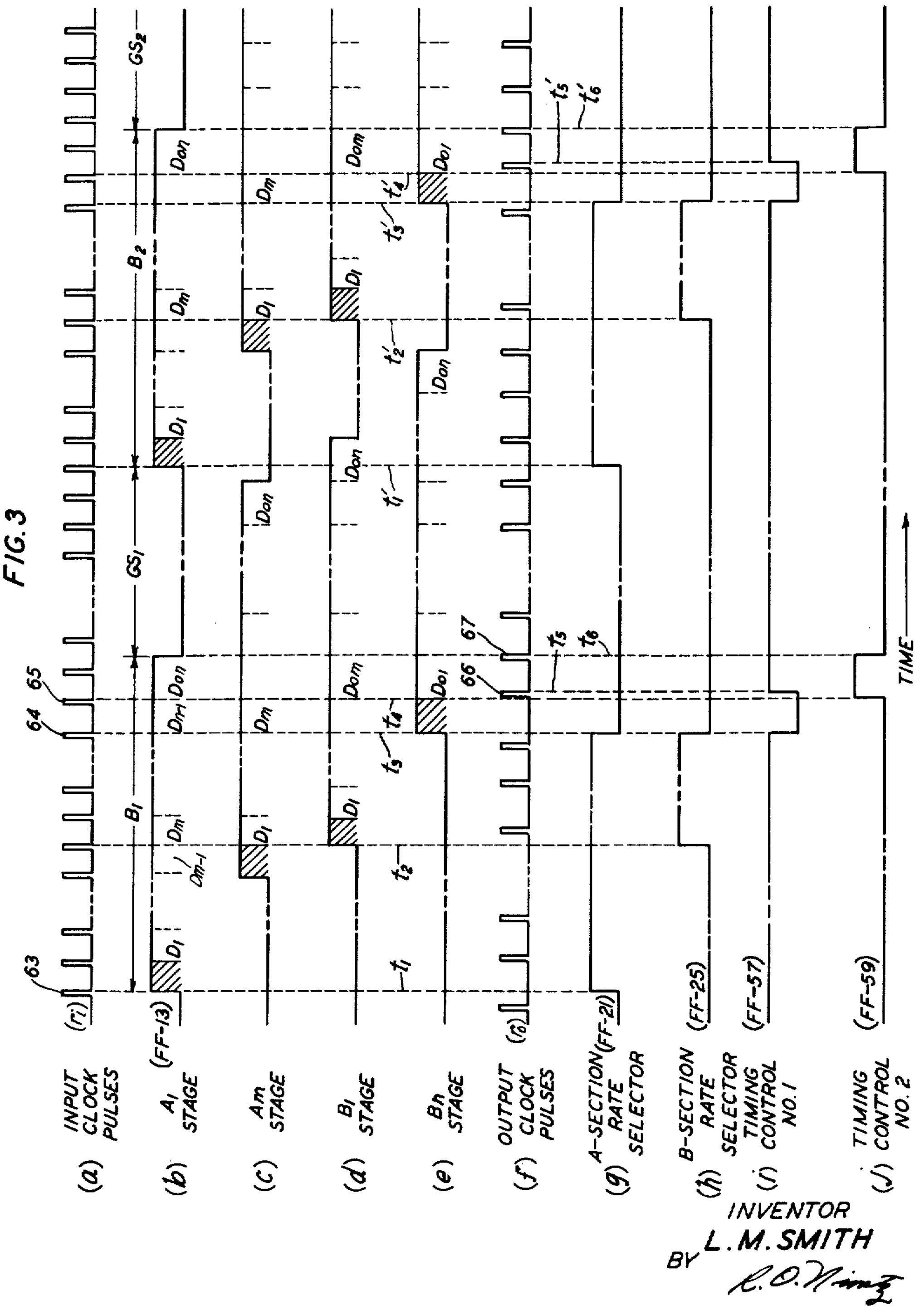
FIG. 3 is a waveform diagram useful in explaining the operation of the converter of FIG. 1.

For the purposes of illustration, it will be assumed that the input pulse rate $r_i$ is substantially higher than the desired output pulse rate $r_o$. This relationship is illustrated graphically with waveforms (*a*) and (*f*) in FIG. 3. FIG. 3 is a diagram of several waveforms useful in explaining the operation of the rate converter circuit of FIG. 1.

Returning to FIG. 1, a message pulse train having a repetition rate of $r_i$ is applied to input terminals 31.

This message pulse train is divided into blocks of uniform length each containing N digits or bits. The first bit of each block is a starting pulse and hence is always a "1" or MARK. When the start pulse arrives at terminals 31, the "1" signal condition is applied to AND gate 36 and, providing bistable device was previously in the "0" state, sets device 21 to the "1" state. When in the "1" state, device 21 enables gate 22 and allows $r_1$ clock pulses to pass through OR gate 24 to advancing bus 17. These pulses operate an input gate 43 and all of the advancing gates, such as gate 16 in the $A_1$ stage, of the A-section 11. Since the clock pulses on bus 29 occur in synchronism with the message bits, these message bits and the start pulse are regularly advanced into the A-section 11.

When the start pulse reaches the last or $A_m$ stage of section 11, AND gate 38 is partially enabled by way of lead 39. Since device 21 is already in the "1" state, gate 38 is fully enabled on the next $r_1$ pulse on bus 29. This same $r_1$ pulse, however, advances the start pulse to the first or $B_1$ stage of B-section 12 of register 10.

The output from gate 38 sets bistable device 25 to enable gate 26 and allow $r_1$ clock pulses to be applied through OR gate 28 to the advancing bus 18 of B-section 12. The message bit therefore continues to advance through A-section 11 into B-section 12 at the input pulse rate $r_1$.

When the start pulse reaches the second-last or $B_{n-1}$ stage of section 11, the signal condition on lead 42 partially enables AND gate 41. Since bistable device 25 is already in the "1" state, gate 41 is fully enabled on the next $r_1$ pulse on bus 29. This same $r_1$ pulse advances the start pulse to the last or $B_n$ stage of section 11 and advances all of the other message bits accordingly.

The output from gate 41 resets both bistable device 21 and bistable device 25, thus inhibiting the $r_1$ advance pulses. Until an enabling signal appears on bus 34, however, gates 23 and 27 will not be completely enabled to pass $r_o$ clock pulses to the advance buses 17 and 18. The reason for this delay will now be given.

It will be remembered that it is the object of the invention to translate each message block into a new code representation as well as change its pulse rate. If the total number of stages in sections 11 and 12 of shift register 10 is equal to N, the number of bits in each message block, translation can be accomplished by means of parallel translating loops. Thus a cable 50 is provided to carry signal conditions representing the contents of all of the stages of A-section 11, and the input to section 11, to a parallel translating circuit 51. Similarly, a second cable 52 is provided to carry signal conditions representing the contents of all of the stages of B-section 12, except the last, to translator 51. Since the last or $B_n$ stage of section 12 now contains the start pulse, it is not necessary to determine its contents. Translation is effected by the enablement of gate 53 which transfers the translated code through cable 54 to the individual inputs of all of the stages of shift register 10. Gate 53 is enabled by a signal on lead 55, derived from timing control circuit 35.

It will be recalled that gate 41 produces a signal on resetting bus 56 when the start pulse is shifted into the last or $B_n$ stage of section 12. At the same time, bistable devices 21 and 25 are reset to remove the $r_1$ advance pulses from sections 11 and 12.

The signal on resetting bus 56 also serves to reset bistable device 57 in timing control circuit 35. The enabling voltage, previously present on bus 34 and derived from the "1" output of device 57, is therefore removed to prevent the complete enablement of gates 23 and 27. Instead, a signal is appplied from the "0" output of device 57 to a three-input AND gate 58. Provided that a second bistable device 59 in timing control circuit 35 is already in the "0" state, the next $r_1$ pulse appearing on bus 29 completely enables gate 58 to set device 59 to the "1" state. At the same time, this setting pulse is applied by way of lead 55 to enable the translating gate 53 and effect the translation.

The "1" output produced when device 59 is set, is applied to a two-input AND gate 60. On the next following $r_o$ pulse from source 33, gate 60 is fully enabled and produces an output to set bistable device 57 back to the "1" state. The "1" output from device 57 is applied to enabling bus 34 and partially enables gates 23 and 27 in networks 19 and 20.

The "1" output of bistable device 59, applied to gate 60, is also applied to a three-input AND gate 61. Another input to gate 61 is derived from the "1" output of bistable device 57, just previously set to the "1" state. On the next following $r_o$ pulse, gate 61 is fully enabled and produces an output to reset device 59 to the "0" state. Since gates 23 and 27 have two of their three inputs energized at this time, this same $r_o$ pulse is applied through these gates to begin the outpulsing of both of sections 11 and 12. Sections 11 and 12 continue to be outpulsed at the output rate to produce the output message train at terminals 62.

The entire operation described above may be better understood by referring to FIG. 3. At time $t_1$, the start pulse, shown crosshatched in the figure, arrives at the input to the rate converter. Its arrival enables gate 36 in FIG. 1 and causes bistable device 21 to go to the "1" state. The state of device 21 is illustrated graphically as waveform (*g*) in FIG. 3. Input clock pulse 63 therefore writes the start pulse into the first or $A_1$ stage of section 11. The contents of the $A_1$ stage are illustrated as waveform (*b*).

The message bits, shown as $D_1$ . . ., are successively pulsed into the $A_1$ stage at the input rate $r_1$. At time $t_2$, the start pulse arrives at the last or $A_m$ stage of section 11. The contents of the $A_m$ stage are illustrated as waveform (*c*). At time $t_2$, gate 38 in FIG. 1 is enabled and bistable device 25 is set to the "1" state. The state of device 25 is illustrated as waveform (*h*).

The message bits are now pulsed into the B-section 12 at the input pulse rate $r_1$. The contents of the first or $B_1$ stage are illustrated as waveform (*d*). Upon the arrival of the start pulse at the second last or $B_{n-1}$ stage of B-section 12, gate 41 in FIG. 1 is partially enabled. On the next $r_1$ pulse, pulse 64, occurring at time $t_3$, the start pulse is written into the last or $B_n$ stage and bistable devices 21 and 25 are reset as seen in waveforms (*g*) and (*h*). The contents of the last or $B_n$ stage of section 12 are illustrated as waveform (*e*).

Pulse 64, which resets devices 21 and 25, also resets bistable devices 57 in timing control circuit 35 of FIG. 1. The state of device 57 is illustrated as waveform (*i*). On the next following $r_1$ pulse, pulse 65, occuring at time $t_4$, bistable device 59 in timing control circuit 35 is set. At this same time, $t_4$, the translator output is gated by way of gate 53 to the various shift register stages. These translated digits, represented by $D_{o1}$ . . ., are shown in waveforms (*b*), (*c*), (*d*) and (*e*).

On the $r_o$ pulse next succeeding this translation, that is, pulse 66 occurring at time $t_5$, device 57 is set again to the "1" state. Things are now ready for outpulsing at the output pulse rate $r_o$. Bistable devices 21 and 25 are in the "0" state and an enabling signal has been applied to bus 34. Therefore, on the next following $r_o$ pulse, pulse 67 occurring at time $t_6$, outpulsing begins. At the same time, bistable device 59 is reset to the "0" condition. Outpulsing continues at the outpulsing rate until the start pulse of the next message block arrives at the input of the converter. The waveforms for a second block of information are also illustrated in FIG. 3.

In accordance with the present invention, the number of stages in the A-section 11 of shift register 10 is chosen such that section 11 is emptied of message bits at the outpulsing rate before the start pulse of the next message block arrives at its input. Similarly, the number of stages in the B-section 12 of shift register 10 is chosen such that section 11 is emptied of the message bits of a first message block at the output rate before the start pulse of the next message block has traversed the A-section 11 at the input pulse rate, that is $n/r_0=m/r_1$. If $k$ is the ratio of the input pulse rate to the output pulse rate, it can be easily shown that $$x_1=\frac{kN}{k+1} \quad (1)$$

and $$x_2=\frac{N}{k+1} \quad (2)$$

where $x_1$ is the number of stages in the A-section, $x_2$ is the number of stages in the B-section and N is the total number of message bits in each message block.

In accordance with the objects of the invention, the total number of stages in shift register 10 in FIG. 1 is equal to N. As was previously discussed, this is the minimum number of stages of storage possible if it is desired to translate each block of N information bits from a first code representation to a second code representation. The rate converter described with reference to FIG. 1 therefore involves a minimum of equipment for its operation.

By dividing shift register 10 into two sections, it is possible to conserve time with this minimum of equipment. Because of this division, the rate converter of FIG. 1 is capable of receiving a new block of information at its input before shift register 10 is entirely empty. That is, the A-section can receive message bits at the input pulse rate at the same time that the B-section is transmitting message bits at the output pulse rate. This saving in time can be considerable, particularly for relatively long message blocks.

It is to be noted that the translation taking place in translator 51 of FIG. 1 may comprise no more than a rearrangement of the message bits, requiring nothing but cross-connections to be effected. It may be desired, for example, merely to reverse the order of the bits in each message block. It may also be desired, however, to translate each block of information to an entirely new code, in which case translator 51 would contain all of the necessary logic to effect the translation.

The rate converter of FIG. 1 has been described under the assumption that a start pulse precedes each message block on the message transmission facility. Clearly, with only minor changes in the circuitry, the start pulse could be derived from a separate transmission facility if so desired. Similarly, the input synchronization pulses could also be derived from a separate transmission facility rather than from the message bits themselves. These and other modifications of the circuit of FIG. 1 will be readily apparent to those skilled in the art and should not be construed as departures from the real scope of the invention.

While the waveforms of FIG. 3 have been derived under the assumption that the input pulse rate is substantially higher than the output pulse rate, the circuit of FIG. 1 has no such limitation. The circuit would operate equally well for the case where the input pulse rate is lower than the output pulse rate, provided only that the terms of Equations 1 and 2 are met.

It will be noted, particularly in waveform (*b*) of FIG. 3, that there is a substantial guard space between the output blocks of information. Since this output rate was assumed to be the lower pulse rate, it is apparent that some time is being lost with the circuit of FIG. 1 even though this lost time is less than would be possible without the present invention. This lost time is represented by the time it takes to fill the B-section of register 10 at the higher input pulse rate. During this interval, information cannot be pulsed out on the transmission line at the lower output pulse rate and hence a guard space is present between the output message blocks. Even this lost time can be conserved, however, with the arrangement of FIG. 2.

Figure 2:
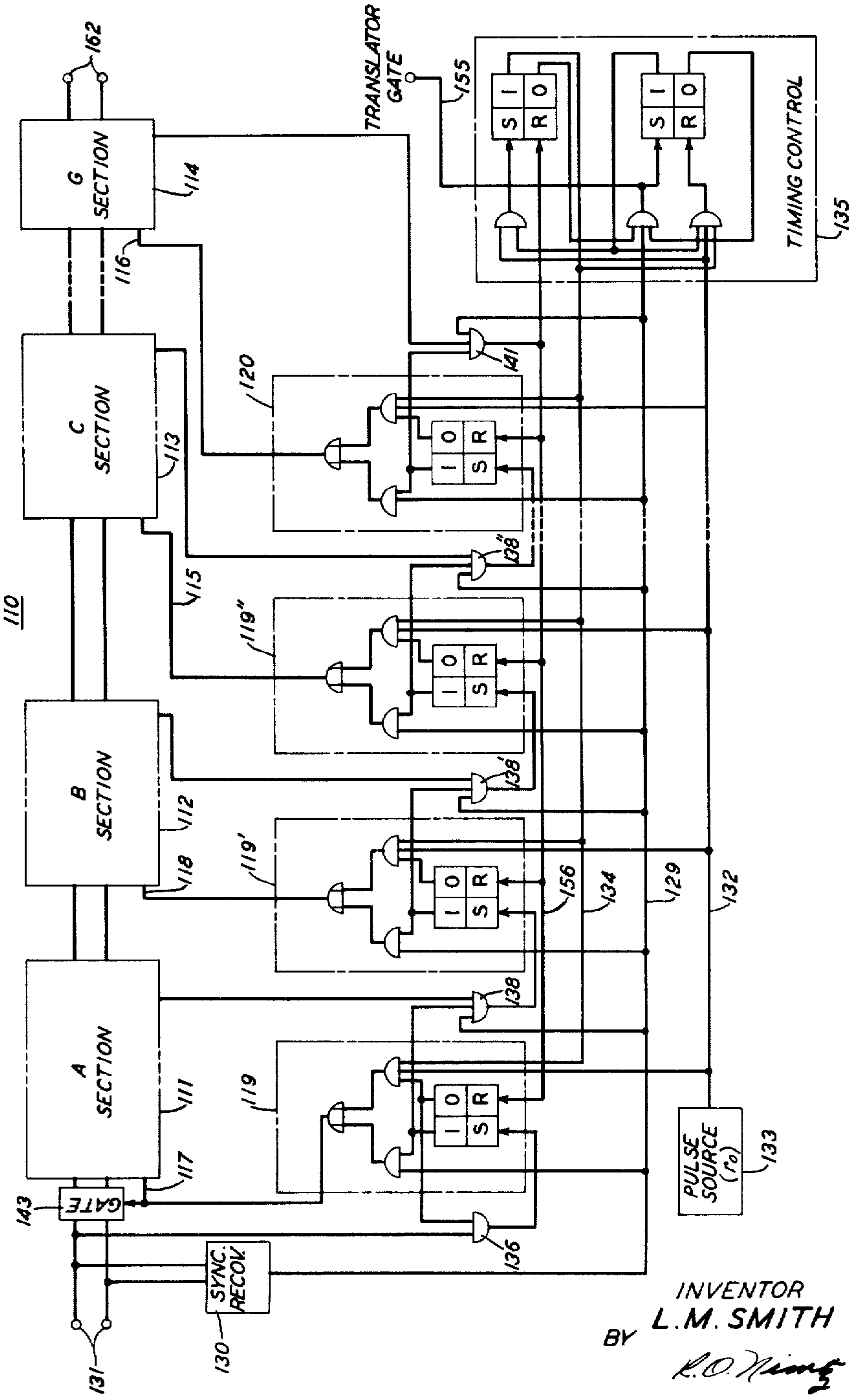
FIG. 2 is a schematic block diagram of a serial pulse rate converter having a shift register split into $n$ sections.

Referring then to FIG. 2 of the drawings, there is shown a pulse rate converter in accordance with the invention in which there is substantially no time loss in effecting the conversion. The converter of FIG. 2 comprises a shift register 110 divided into a plurality of sections, the A-section 111, the B-section 112, the C-section 113 and on to the G-section 114. Each section of register 110, excepting possibly the last or G-section 114, comprises a plurality of shift register stages similar to the $A_1$ stage of section 11 in FIG. 1. The state of each stage is advanced to the next succeeding stage by the application of shifting pulses to the respective shifting buses. Pulses applied to bus 117, for example, advance the states in section 111. Similarly, pulses on bus 118 advance the states in section 112, pulses on bus 115 advance the states in section 113 and pulses on bus 116 advances the states in section 114.

In accordance with the present invention, each of sections 111, 112, 113 and 114 of register 110 is capable of being shifted at two different rates independently of the remainder of the sections. To this end, shift pulses for section 111 are derived from rate selecting network 119, shift pulses for section 112 are derived from rate selecting network 119′, shift pulses for section 113 from network 119″, and for section 114 from network 120. Networks 119 through 120 are each identical to each other and to networks 19 and 20 in FIG. 1. They each comprise a bistable device, two AND gates and an OR gate. Since these networks operate in the same manner as the corresponding networks in FIG. 1, the detailed description of this operation will not be repeated. It is sufficient to state that upon the enablement of gate 136, network 119 serves to apply clock pulses, derived in synchronization recovery circuit 130 and appearing on bus 129, to advancing bus 117 for section 111. These pulses occur at the input pulse rate $r_1$. Similarly, upon the enablement of gate 138, network 119′ applies $r_1$ clock pulses from bus 129 to advancing bus 118 in section 112 and, upon the enablement of gate 138′, network 119″ applies $r_1$ clock pulses from bus 129 to advancing bus 115 of section 113. In a similar manner, network 120 serves to apply $r_1$ clock pulses to bus 116 in section 114. Gate 136 is similar to gate 36 in FIG. 1 while gates 138, 138′ and 138″ are similar to gate 38 in FIG. 1.

Gate 141 is similar to gate 41 in FIG. 1 and serves to apply a signal to resetting bus 156. This signal resets the bistable devices in each of the pulse rate selecting networks 119 through 120. Upon the energization of bus 134 from timing control circuit 135, networks 119 through 120 apply clock pulses at the output pulse rate $r_0$ to the advance buses of their respective sections of register 110.

Timing control circuit 135 is similar to circuit 35 in FIG. 1 and serves to generate the signal applied to bus 134 in the same manner as circuit 35 in FIG. 1. Circuit 135 also applies a pulse to lead 155 to operate a translating gate, not shown, to effect the parallel translation. The translator and the translating loops have beent omitted from FIG. 2 for the sake of simplicity. It is clear, however, that these loops would interconnect the outputs of the individual stages of register 110 with their inputs.

The operation of the circuit of FIG. 2 is similar to that of FIG. 1. A message pulse train, having a repetition rate $r_1$, is applied to input terminals 131. This message train is divided into blocks of uniform length of N bits or digits. The first bit of each block is a MARK start pulse. The start pulse completes the enablement of AND gate 136 and, by way of network 119, applies $r_1$ clock pulses to advancing bus 117. These pulses operate input gate 143 and all of the advancing gates of section 111 to advance the message block into section 111. When the start pulse reaches the last stage of section 111, AND gate 138 permits the application of $r_1$ clock pulses to advance section 112. Similarly, when the start pulse reaches the last stage of section 112, AND gate 138′ permits the application of $r_1$ clock pulses to advance section 113. In this way, the message block is advanced through sections 111, 112, 113, etc to the last section 114.

When the start pulse reaches the second last stage of section 114, AND gate 141 resets all of the bistable devices in networks 119, 119', 119'' and 120 and begins a timing cycle in timing control circuit 135. Circuit 135 produces the translation pulse and, after translation is complete, allows $r_0$ clock pulse to be applied to the advancing buses of all of the sections of register 110. This is done by energizing enabling bus 134.

In accordance with the present invention, the number of stages in section 111 of register 110 is chosen such that section 111 is emptied of message bits at the outpulsing rate before the start pulse of the next message block arrives at its input. Similarly, the number of stages in each of the other sections of register 110 is chosen such that each section is emptied of message bits at the output pulse rate before the start pulse of the next message block leaves te preceding section. Again, if $k$ is the ratio of the input pulse rate to the output pulse rate, it can be easily seen that the number of stages in the first section 111 is given by $$x_1 \geqq \frac{k^{n-1}N}{k^{n-1}+k^{n-2}+\ldots+k+1} \quad (3)$$

and the number of stages in the last section is given by $$x_n \geqq \frac{N}{k^{n-1}+k^{n-2}+\ldots+k+1} \quad (4)$$

where $x_1$ is the number of stages in the first section, $x_n$ is the number of stages in the last section, $n$ is the total number of sections and N, as before, is the total number of message bits in each message block. The general formula for the number of stages in the $i$th section is given by $$x_i \geqq \frac{k^{n-i}N}{k^{n-1}+k^{n-2}+\ldots+k+1} \quad (5)$$

where $x_i$ is the number of stages in the $i$th section. These formulae are, of course, only approximate since the number of stages must always be an interger, and, furthermore, may have to be adjusted to accommodate a particular number N.

It can be seen that with the further subdivisions of the shift register, it is no longer necessary to wait for the last section of the register to empty before transferring message bits from the first section. Indeed, the last section of register 110 in FIG. 2, section 114, may have only one stage. In this case, the only loss of time is one time slot required for translation plus the time representing the difference in phase of the two clock pulse trains. For example, if the inpulsing rate is 1300 pulses per second and the outpulsing rate is 750 pulses per second ($k$=1.733), while the number of digits in each block is 93, Equations 3, 4 and 5 would be approximately satisfied by a shift register of seven sections having 42, 24, 13, 7, 4, 2 and 1 stages, respectively.

It is to be understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a first single transmission line for transmitting serial information-bearing pulse trains at a first repetition rate, a second single transmission line for transmitting serial information-bearing pulse trains at a second repetition rate different from said first repetition rate, and a pulse rate converter interposed between said first and second transmission lines for translating pulse trains at said first repetition rate on said first transmission line into pulse trains at said second repetition rate on said second transmission line, said converter comprising: an input shift register and an output shift register connected in series between said first and second transmission lines, a first source of advance pulses having said first repetition rate, a second source of advance pulses having said second repetition rate, means for applying advance pulses from said first source to each of said shift registers in synchronism with the arrival of a first pulse in each of said information-bearing pulse trains at that shift register, and means for applying advance pulses from said second source to each of said shift registers, in synchronism with the departure of said first pulse from said output shift register.

2. The combination according to claim 1 wherein the ratio of the number of stages in said input shift register to the number of stages in said output shift register is equal to the ratio of said first and second repetition rates.

3. In combination, a first single transmission line for transmitting serial information-bearing N-digit pulse trains at a first repetition rate, a second single transmission line for transmitting serial information-bearing N-digit pulse trains at a second repetition rate different from said first repetition rate, and a pulse rate converter interposed between said first and second transmission lines for translating pulse trains at said first repetition rate on said first transmission line into pulse trains at said second repetition rate on said second transmission line, said converter comprising: a plurality of shift registers connected in series between said first and second transmission lines, each of said shift registers having a number of stages bearing substantially the same ratio to the number of stages of an adjacent one of said shift registers as the ratio of said first and second repetition rates, the total number of stages in all of said shift registers equalling N, means for advancing pulses of said pulse trains into each of said shift registers at said first repetition rate, and means for advancing said pulses out of each of said shift registers at said second repetition rate only when all of said shift registers are filled.

4. The combination according to claim 3 further including parallel translating means, and means for transmitting each said N-digit pulse train in parallel through said translating means and back to said shift registers when, and only when, all of said shift registers are filled.

References Cited in the file of this patent

UNITED STATES PATENTS

| | | |
|---|---|---|
| 2,905,930 | Golden | Sept. 22, 1959 |
| 2,911,622 | Ayres et al. | Nov. 3, 1959 |
| 2,911,625 | Chien | Nov. 3, 1959 |
| 2,969,522 | Crosby | Jan. 24, 1961 |

FOREIGN PATENTS

| | | |
|---|---|---|
| 786,466 | Great Britain | Nov. 20, 1957 |

OTHER REFERENCES

Waveforms, by Chance et al., McGraw-Hill, 1949.